April 21, 1936.  C. SMITH  2,038,453
RUBBER TIRED SKATE WHEEL
Filed July 1, 1935
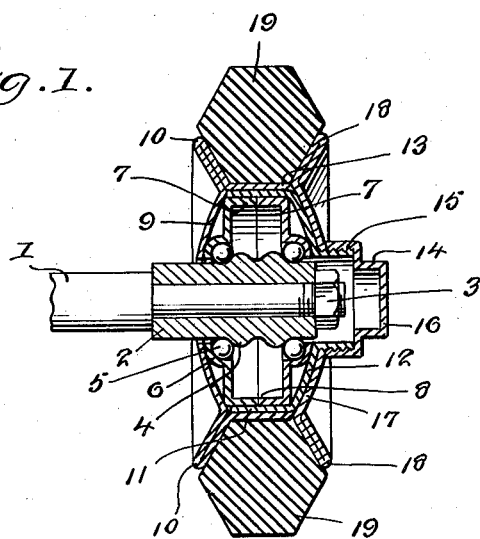
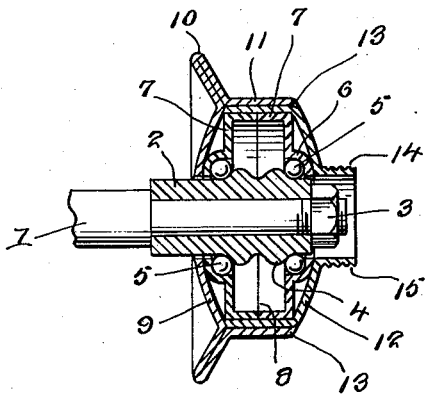 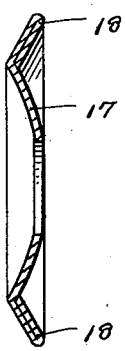 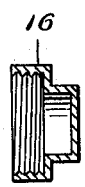
Clyde Smith
INVENTOR
BY Victor J. Evans & Co.
ATTORNEYS Patented Apr. 21, 1936

2,038,453

UNITED STATES PATENT OFFICE 2,038,453

RUBBER TIRED SKATE WHEEL

Clyde Smith, Raceland, Ky., assignor of one-half to Harry B. Colvin, Raceland, Ky.

Application July 1, 1935, Serial No. 29,356

1 Claim. (Cl. 208—181)

This invention relates to skate wheels and has for the primary object the provision of a device of this character which will rotate freely on a skate axle with friction reduced to a minimum and its construction is such that its assemblage may be easily accomplished to permit mounting and demounting of a rubber tire, the latter acting to cushion or absorb shocks to increase skating comfort and also preventing marring or injury to skating surfaces.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a skate wheel constructed in accordance with my invention.

Figure 2 is a similar view showing the wheel partly disassembled.

Figure 3 is a sectional view showing one of the parts of the wheel removed.

Figure 4 is a sectional view showing a cap for the wheel.

Referring in detail to the drawing, the numeral 1 indicates a skate axle on which is mounted a bearing sleeve 2 and retained thereon by a nut 3. The sleeve 2 forms an inner ball race by providing thereon spaced annular ribs 4. Series of ball bearings 5 contact the races defined by the ribs 4 and also contact outer races 6 forming an integral part of companion wheel sections 7 having abutting engagement, as shown at 8.

A side wheel plate 9 contacts the race 6 of one of the wheel sections 7 and is bent upon itself to form a tire flange 10 and a peripheral portion 11. The other wheel section 7 and also the race 6 thereof is contacted by a plate 12. The plate 12 overlies the peripheries of the wheel sections with the peripheral portion 11 of the wheel plate 9 resting thereon. The portion 11 is bent or clinched to the plate 12, as shown at 13, retaining the campanion wheel sections 8 together. The plate 12 includes a hub portion 14 externally threaded, as shown at 15, to receive an internally threaded hub cap 16. A wheel plate 17 is mounted on the hub portion 14 and contacts the plate 12 and is bent upon itself to form a tire flange 18 cooperating with the tire flange 10 in supporting a cushion tire 19 of a desired section in cross section. By detaching the cap from the hub portion 14, the plate 17 can be removed and permit easy demounting of the tire 19. The hub cap 16 may be packed with lubricant and the latter may readily pass to the ball bearing due to the construction described.

Having described the invention, I claim:

A skate wheel including an inner race, a wheel construction including companion sections having races, ball bearings supported by said races, a side plate engaging one of the companion sections of the wheel construction and bent upon itself to form a tire flange, a plate contacting the companion sections and the side plate and provided with a threaded hub portion, said side plate being clinched to the second plate, a side plate removably mounted on the hub and contacting the second plate and bent upon itself to form a tire flange cooperating with the first-named tire flange in supporting a cushion tire, and a lubricant containing cap threaded to the hub portion and abutting the second-named side plate.

CLYDE SMITH.